United States Patent
Blom (10) Patent No.: US 9,238,339 B2
(45) Date of Patent: Jan. 19, 2016

(54) HYBRID FASTENER AND METHOD OF MAKING THE SAME

(71) Applicant: The Boeing Company, Chicago, IL (US)

(72) Inventor: Adriana Willempje Blom, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 273 days.

(21) Appl. No.: 13/773,120

(22) Filed: Feb. 21, 2013

(65) Prior Publication Data

US 2014/0234052 A1    Aug. 21, 2014

(51) Int. Cl.
| | |
|---|---|
| *F16B 35/04* | (2006.01) |
| *B29D 1/00* | (2006.01) |
| *B29C 70/46* | (2006.01) |
| *B29C 70/12* | (2006.01) |
| *F16B 33/00* | (2006.01) |
| *B29L 1/00* | (2006.01) |

(52) U.S. Cl.
CPC ............. *B29D 1/005* (2013.01); *B29C 70/12* (2013.01); *B29C 70/462* (2013.01); *F16B 33/006* (2013.01); *B29L 2001/00* (2013.01)

(58) Field of Classification Search
CPC ...... B29L 2001/00; B29D 1/05; B29C 70/12; F16B 33/06
USPC .......................................................... 411/11
See application file for complete search history.

(56) References Cited

U.S. PATENT DOCUMENTS

| | | | |
|---|---|---|---|
| 2,949,054 A | 8/1960 | White | |
| 3,646,610 A | 2/1972 | Jackson | |
| 4,370,390 A | 1/1983 | Burk | |
| 4,433,652 A | 2/1984 | Holtzberg et al. | |
| 4,623,290 A | 11/1986 | Kikuzawa et al. | |
| 4,717,302 A | 1/1988 | Adams et al. | |
| 4,718,801 A * | 1/1988 | Berecz .................. | 411/378 |
| 4,824,314 A * | 4/1989 | Stencel ................ | 411/378 |
| 4,925,719 A | 5/1990 | Staneluis et al. | |
| 4,975,014 A * | 12/1990 | Rufin et al. .......... | 411/385 |
| 4,983,451 A | 1/1991 | Sugino et al. | |
| 4,987,175 A | 1/1991 | Bunnell, Sr. | |
| 5,056,257 A | 10/1991 | Cook | |
| 5,057,257 A | 10/1991 | Neitzke | |
| 5,062,415 A | 11/1991 | Weatherby et al. | |
| 5,090,857 A * | 2/1992 | Dunn .................... | 411/385 |
| 5,151,322 A | 9/1992 | Kimoto et al. | |
| 5,292,215 A * | 3/1994 | Roberts, III ......... | 411/424 |
| 5,569,008 A * | 10/1996 | Chapkovich ......... | 411/383 |

(Continued)

FOREIGN PATENT DOCUMENTS

| | | |
|---|---|---|
| DE | 102009032990 A1 | 2/2010 |
| EP | 0254481 A1 | 1/1988 |

(Continued)

OTHER PUBLICATIONS

Office Action, dated Dec. 26, 2012, regarding U.S. Appl. No. 12/613,842, 17 pages.

(Continued)

*Primary Examiner* — Gary Estremsky
(74) *Attorney, Agent, or Firm* — Yee & Associates, P.C.

(57) ABSTRACT

A hybrid fastener comprises a composite body having a tip, and a metal sleeve surrounding and locked to the tip.

20 Claims, 5 Drawing Sheets

(56) References Cited

U.S. PATENT DOCUMENTS

| | | | |
|---|---|---|---|
| 6,106,752 | A | 8/2000 | Chang et al. |
| 6,521,152 | B1 | 2/2003 | Wood et al. |
| 6,924,021 | B1 | 8/2005 | Colegrove et al. |
| 7,198,739 | B2 | 4/2007 | LaForest et al. |
| 7,208,220 | B2 | 4/2007 | Yamasaki et al. |
| 7,462,879 | B2 | 12/2008 | Oohata et al. |
| 7,527,759 | B2 | 5/2009 | Lee et al. |
| 7,896,599 | B2 * | 3/2011 | Stephen et al. ............... 411/377 |
| 8,101,262 | B2 | 1/2012 | Yamanouchi et al. |
| 8,329,280 | B2 | 12/2012 | Taketa et al. |
| 2003/0057590 | A1 | 3/2003 | Loher et al. |
| 2006/0125156 | A1 | 6/2006 | Woolhouse |
| 2007/0149080 | A1 | 6/2007 | Asahara et al. |
| 2008/0169380 | A1 | 7/2008 | Jackson et al. |
| 2009/0110901 | A1 | 4/2009 | Gaw et al. |
| 2011/0111172 | A1 | 5/2011 | Gideon et al. |
| 2013/0022391 | A1 | 1/2013 | Fisher, Jr. et al. |
| 2013/0047403 | A1 | 2/2013 | Gideon et al. |

FOREIGN PATENT DOCUMENTS

| | | |
|---|---|---|
| EP | 0376472 A2 | 7/1990 |
| EP | 0419403 A1 | 3/1991 |
| EP | 0916477 A1 | 5/1999 |
| GB | 2349600 A | 11/2000 |
| SU | 545785 A1 | 2/1977 |
| WO | 8909123 A1 | 10/1989 |
| WO | WO9619336 A1 | 6/1996 |
| WO | WO2008011404 A2 | 1/2008 |
| WO | 2008149615 A1 | 12/2008 |
| WO | 2009120920 A1 | 10/2009 |
| WO | 2011056293 A1 | 5/2011 |

OTHER PUBLICATIONS

Office Action, dated Apr. 9, 2013, regarding U.S. Appl. No. 12/613,842, 18 pages.

Office Action, dated Apr. 11, 2013, regarding U.S. Appl. No. 13/653,080, 32 pages.

Notice of Allowance, dated Dec. 9, 2013, regarding U.S. Appl. No. 12/613,842, 14 pages.

Notice of Allowance, dated Dec. 11, 2013, regarding U.S. Appl. No. 13/653,080, 14 pages.

Fisher, Jr., "Narrow Flake Composite Fiber Material Compression Molding," U.S. Appl. No. 13/356,132, filed Jan. 23, 2012, 23 pages.

"Compression Molding," Wikipedia, dated May 26, 2012, 4 pages, accessed May 30, 2012, http://en.wikipedia.org/wiki/Compression_molding.

"Fabrication Methods," Composites World, dated Nov. 1, 2007, 9 pages, accessed May 30, 2012, http://www.compositesworld.com/articles/fabrication-methods.

"HexMC Moulding Concept Carbon Epoxy HexMC/C/2000/M77 Product Data," Hexcel Corporation, Publication FTC112h, Oct. 2012, 2 pages.

"HexMC Moulding Concept Carbon Epoxy HexMC/C/2000/R1A Product Data," Hexcel Corporation, Publication FTC112f, Dec. 2008, 2 pages.

"HexTow Chopped Fiber Carbon Fiber Product Data," Hexcel Corporation, Sep. 2009, 2 pages.

Black "Redeisgning for Simplicity and Economy," High-Performance Composites, Jan. 2012, 4 pages, accessed Feb. 28, 2013, http://www.compositesworld.com/articles/redesigning-for-simplicity-and-economy.

Brosius, "Thermoplastic Composites Making an Impact," Composites World, dated Feb. 1, 2003, 6 pages, accessed May 30, 2012, http://www.compositesworld.com/articles/thermoplastic-composites-making-an-impact.

International Search Report and Written Opinion, dated Feb. 10, 2011, regarding Application No. PCT/US2010/048017 (WO2011056293), 10 pages.

Pan et al., "Analysis of 3D Random Chopped Fiber Reinforced Composites Using FEM and Random Absorption," ScienceDirect, Computational Materials Science, vol. 43, Issue 3, Sep. 2008, 27 pages.

Bartel et al., "Method and Apparatus for Fabricating Composite Fasteners," U.S. Appl. No. 13/773,042, filed Feb. 21, 2013, 29 pages.

International Search Report and Written Opinion, dated Apr. 28, 2014, regarding Application No. PCT/US2014/012013, 9 pages.

International Search Report and Written Opinion, dated Apr. 29, 2014, regarding Application No. PCT/US2014/012021, 11 pages.

Office Action, dated Jul. 8, 2015, regarding U.S. Appl. No. 13/773,042, 28 pages.

Office Action, dated Jul. 8, 2015, regarding U.S. Appl. No. 14/182,287, 27 pages.

Notice of Allowance, dated Aug. 4, 2015, regarding U.S. Appl. No. 14/182,287, 10 pages.

International Preliminary Report on Patentability, dated Aug. 25, 2015, regarding Application No. PCT/US2014/012021, 6pages.

* cited by examiner

HYBRID FASTENER AND METHOD OF MAKING THE SAME

CROSS REFERENCE TO RELATED APPLICATIONS

This application is related to co-pending U.S. patent application Ser. No. 13/773,042, status pending, filed concurrently herewith on Feb. 21, 2013, which is incorporated by reference herein in its entirety.

BACKGROUND INFORMATION

1. Field

The present disclosure generally relates to fasteners, and deals more particularly with a hybrid fastener and method for making the fastener.

2. Background

Composite fasteners such as threaded bolts and screws have been developed for use in several applications because of their relatively light weight, compared with metal fasteners. Composite fasteners may be fabricated using any of several manufacturing techniques, and may include continuous, axial fiber reinforcements that strengthen the fastener in its axial direction to resist tension forces. Because the fiber reinforcement is designed to provide strength substantially only in the axial direction, the fastener is substantially anisotropic and therefore may not be suitable for some applications. Moreover, composite threads may not be capable of carrying the desired loads.

Accordingly, there is a need for a high strength, composite fastener that exhibits quasi-isotropic properties, and which includes threads, or similar features, capable of carrying high loads. There is also a need for an efficient method for fabricating such fasteners quickly and in high-volume.

SUMMARY

According to the disclosed embodiments, a hybrid fastener is provided that exhibits quasi-isotropic properties and has features of increased strength, such as threads, capable of carrying relatively high loads. The fastener includes a fiber reinforced thermoplastic fastener body partially covered by a metal sleeve which may include threads or other fastener features. The thermoplastic fastener body and the metal sleeve have complemental tapers which lock the metal sleeve on the fastener body. The thermoplastic fastener body is reinforced by randomly oriented fiber flakes. The disclosed hybrid fastener may be quickly produced in high-volume using conventional compression molding machines and an insert molding technique in which the metal sleeves are inserted into mold cavities having geometries matching the finished fasteners. The mold cavities are filled using a flowable mixture of fiber flakes and melted thermoplastic resin, resulting in hybrid fasteners having high strength aided by a high fiber content.

According to one disclosed embodiment, a hybrid fastener is provided comprising a composite body having a tip, and a metal sleeve surrounding and locked to the tip. The tip and the metal sleeve have complementary tapered surfaces locking the metal sleeve to the tip, and the metal sleeve includes outer threads. The composite body includes a shoulder, and the metal sleeve has an end engaging the shoulder of the composite body. The tip may have an outer tapered surface having a non-circular cross-sectional shape. The cross-sectional shape of the tip may not be uniform along the length of the tip. The metal sleeve includes an inner surface engaging the outer tapered surface of the tip substantially along the entire length of the tip. The composite body comprises a thermoplastic resin and randomly oriented, short reinforcing fibers distributed throughout the thermoplastic resin.

According to another disclosed embodiment, a hybrid male fastener comprises a composite body including a shank and a tip on the shank, the tip having an outer surface with a taper, and a metal sleeve on the tip, the metal sleeve including an inner surface having a taper substantially matching the taper of the tip. The metal sleeve includes a threaded outer surface. The cross-sectional shape of each of the outer surface of the tip and the inner surface of the metal sleeve are substantially circular. The cross-sectional shape of each of the outer surface of the tip and the inner surface of the metal sleeve are asymmetric about a longitudinal axis of the composite body. The composite body includes a thermoplastic resin reinforced with fiber flakes having substantially random fiber orientations.

According to still another embodiment, a fastener comprises a resin body including an elongate shaft having first and second ends, and a head on the first end of the shaft. The fastener further comprises a tip on the second end of the shaft, the tip having a length and an outer surface tapering radially along the longitudinal axis of the tip, and a metal sleeve sleeved over and substantially covering the tip. The metal sleeve includes an outer surface provided with male threads, and an inner surface engaging and tapered to substantially match the taper of the outer surface of the tip, the outer surface of the tip and the inner surface of the metal sleeve interlocking to hold the metal sleeve on the shaft. The resin body includes a thermoplastic resin reinforced with fiber flakes having substantially random fiber orientations. The tip has a cross-sectional shape that varies along the length of the tip. The metal sleeve and the tip are substantially coaxial. Each of the tip and the metal sleeve are tapered radially outwardly in a direction away from the head, and each may have non-cross-sectional shapes.

According to a further embodiment a method is provided of producing a hybrid fastener. The method comprises forming a metal sleeve having an internal through-hole therein, inserting the metal sleeve in a mold cavity, and flowing a mixture of a melted thermoplastic resin and fiber flakes into the mold cavity, including filling the internal tapered through-hole with the mixture.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
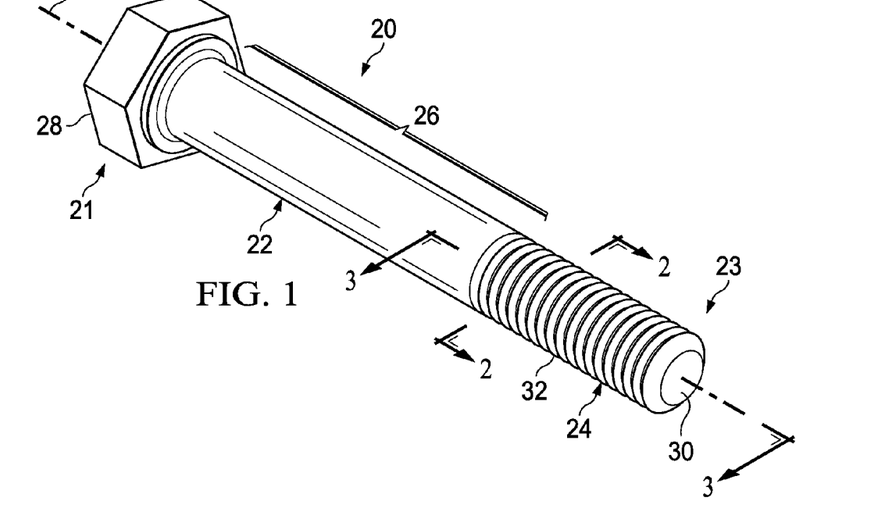
FIG. 1 is an illustration of a perspective view of a hybrid fastener according to one disclosed embodiment.
Figure 2:
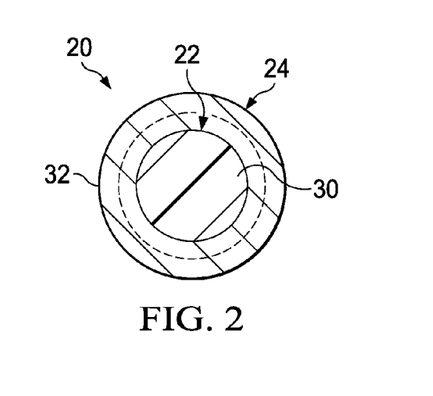
FIG. 2 is an illustration of a sectional view taken along the line 2-2 in FIG. 1.

Referring first to FIGS. 1 and 2, an elongate, hybrid fastener 20 comprises a unitary, composite body 22 which may be formed of a fiber reinforced resin, such as, for example and without limitation a fiber reinforced thermoplastic resin. The composite body 22 may be substantially symmetrical about its longitudinal axis 34 and has first and second ends 21, 23, respectively. The first end 21 of the composite body 22 is provided with a head 28 to allow the hybrid fastener 20 to be torqued. In the illustrated embodiment, the head 21 is a hex head, however a variety of other head configurations are possible which are suitable for use with different types of tools (not shown).

The composite body 22 further comprises a generally cylindrical shank 26 that transitions into a tip 30 at the second end 23 of the composite body 22. A metal sleeve 24 is sleeved over and is locked to the tip 30, by a locking construction that will be described below in more detail. The outer surface of the metal sleeve 24 is provided with a set of male threads 32 which allow the hybrid fastener 20 to be threadably coupled with a female member (not shown) such as a tapped hole in a structure (not shown), or another fastener such as a nut (not shown). The metal sleeve 24 may be formed of any relatively high strength metal that is suitable for the application, and compatible with the resin from which the composite body 22 is formed. The metal sleeve and 24 may be fabricated using any of a variety of known processes such as, without limitation, additive manufacturing, tapered drilling to form the tapered through hole 40, metal die casting, or a combination of these processes. In the case of additive manufacturing, the metal sleeve may be fabricated by direct metal laser sintering, fused deposition modeling, electron beam melting, or selective laser sintering. Other fabrication techniques are possible.

Both the shank 26 including the tip 30, and the metal sleeve 24 have substantially circular cross-sections, resulting in the tip and the metal sleeve 24 being coaxial and substantially symmetric about the longitudinal axis 34 of the hybrid fastener 20. However as will become later apparent, other cross-sectional shapes are possible, and some features of each of the tip 30 and the metal sleeve 24 may be asymmetric relative to the longitudinal axis 34.

Figures 4, 5, 6, 7:
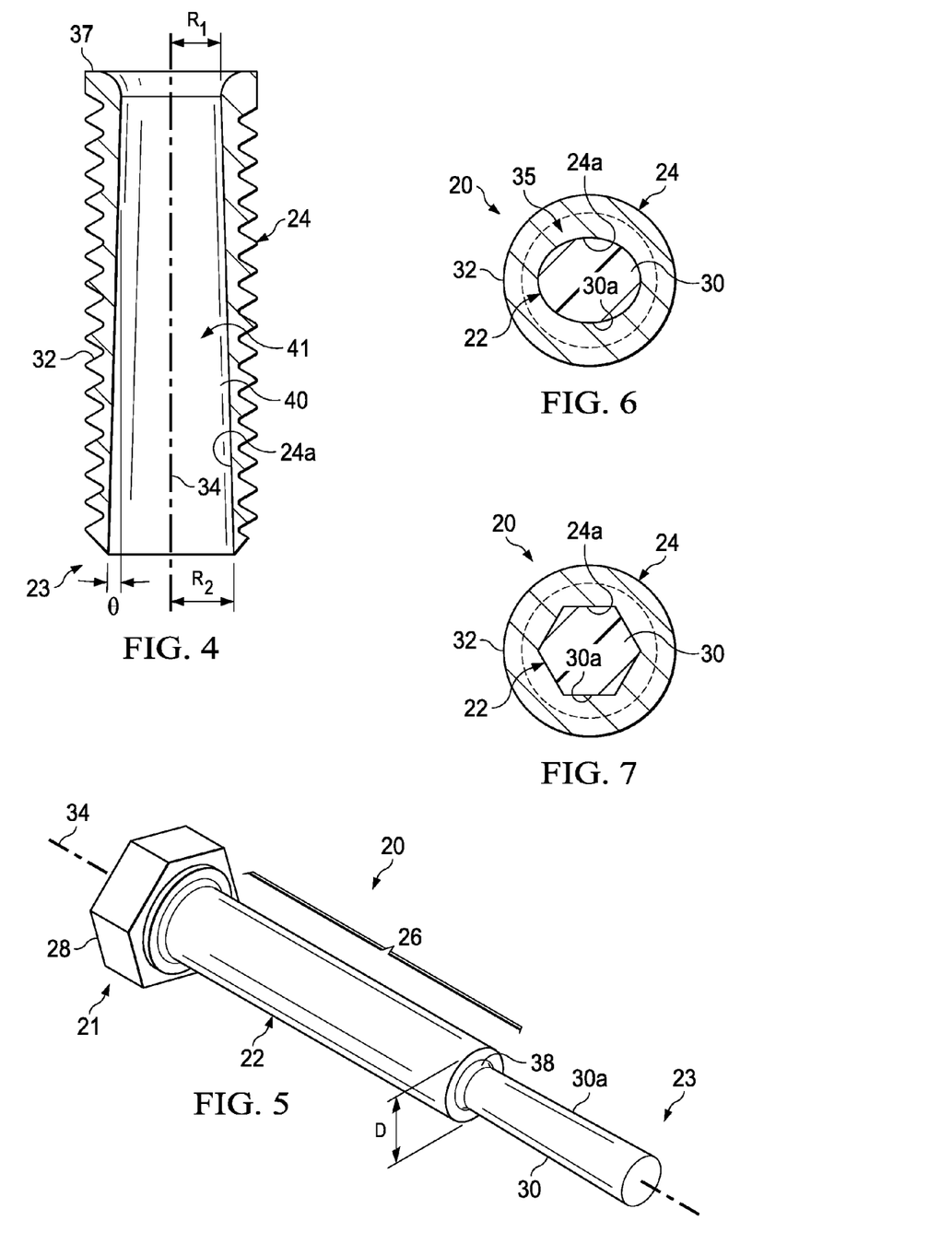
FIG. 4 is an illustration of a longitudinal, cross-sectional view of the metal sleeve forming part of the hybrid fastener shown in FIG. 1.
FIG. 5 is an illustration similar to FIG. 1, but wherein a metal sleeve having been removed to reveal the tapered tip of the fastener body.
FIG. 6 is an illustration similar to FIG. 2, but showing an alternate embodiment of the fastener.
FIG. 7 is an illustration similar to FIG. 2, but showing another alternate embodiment of the fastener.

Referring now also to FIG. 5, the diameter D of the shank 26 is stepped down to form a shoulder 38 as it transitions to the tip 30. The tip 30 is solid and has an outer surface 30a that tapers radially outward along the longitudinal axis 34, increasing in cross-sectional area from the shoulder 38 to the second end 23 of the composite body 22. In the embodiment illustrated in FIG. 5, the tip 30 is symmetric about the longitudinal axis 34 and has the shape of a tapered cylinder. The length of the tip 30 and of the metal sleeve 24 in the direction of the longitudinal axis 34 may vary with the application. In some embodiments, the metal sleeve 24 and the locking construction between the metal sleeve 24 and the shank 26 may not be limited to the tip 30, but rather may extend substantially the entire length of the shank 26.

Figure 3:
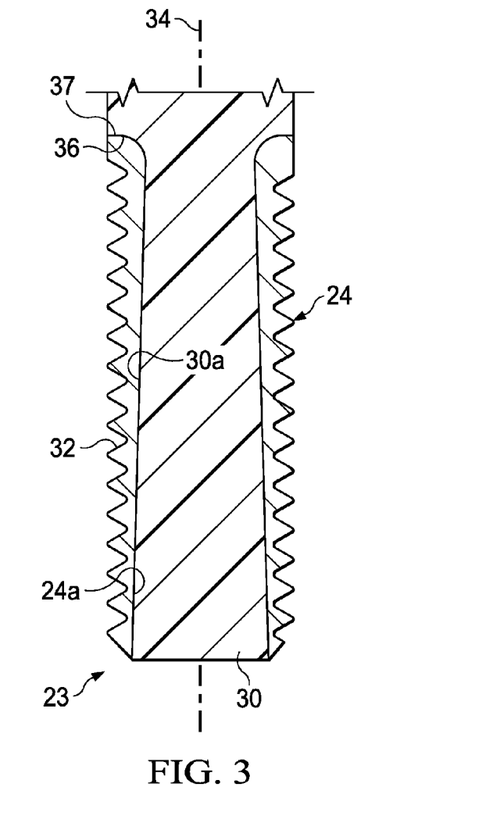
FIG. 3 is an illustration of a sectional view taken along the line 3-3 in FIG. 1.

Attention is now directed to FIGS. 3 and 4 which illustrate additional details of the metal sleeve 24 and the locking construction between the metal sleeve 24 and the tip 30 of the shank 26. As shown in FIG. 4, the metal sleeve 24 has a hollow interior 40 forming a through-hole 41. The radius $R_1$ of the through-hole 41 is less than the radius $R_2$ at the opposite outer and thereof, resulting in an inner surface 24a that is tapered along substantially its entire length at a taper angle θ. The longitudinal taper of the inner surface 24a of the metal sleeve 24 includes an inner surface 24a substantially matches the taper of the outer surface 30a of tip 30. The inner and outer surfaces 24a, 30a are thus complementally tapered to match and engage each other substantially throughout the entire length of the tip 30. It may be desirable to provide the outer surface 38 of the tip 30 with a relatively rough surface texture to increase grip between the metal sleeve 24 and the tip 30 in order to resist shear forces resulting from torqueing of the hybrid fastener 20. One end 37 of the metal sleeve 24 engages the shoulder 36 on the shank 26 in order to transmit compression loads to the shank 26 resulting from loads applied to the threads 32.

Referring now to FIG. 6, in some embodiments, particularly in applications where the hybrid fastener 20 is torqued to higher loads, it may be necessary or desirable to lock the metal sleeve 24 against rotation about the longitudinal axis 34 relative to the tip 30. In such applications, the inner surface 24a of the metal sleeve 24, and the outside surface 30a of the tip 30 may be formed into a non-circular shape, for example, formed into the oval shape shown in FIG. 6. A variety of other non-circular cross-sectional shapes are possible. For example, FIG. 7 illustrates complemental inner and outer surfaces 24a, 30a that are hexagonal in shape. Moreover, although not shown in the drawings, it may be possible to vary the cross-sectional shapes of the inner and outer surfaces 24a, 30a along the length of the tip 30. Varying the cross-sectional shapes of the inner and outer surfaces 20a, 30a along the length of the tip 30 may further aid in locking the metal sleeve 24 to the tip 30 and resisting tension and/or compression loads applied to the hybrid fastener 20.

As previously mentioned, the composite body 22 may comprise a suitable thermoplastic resin reinforced with discontinuous or "short" fibers. The thermoplastic resin may comprise, for example and without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), to name only a few. The reinforcing fibers preferably comprise a high-volume percentage of the composite body 22, for example approximately 60% or more by volume, and may include any of a variety of high-strength fibers, such as, without limitation, carbon, metal, ceramic and/or glass fibers.

Figure 8:
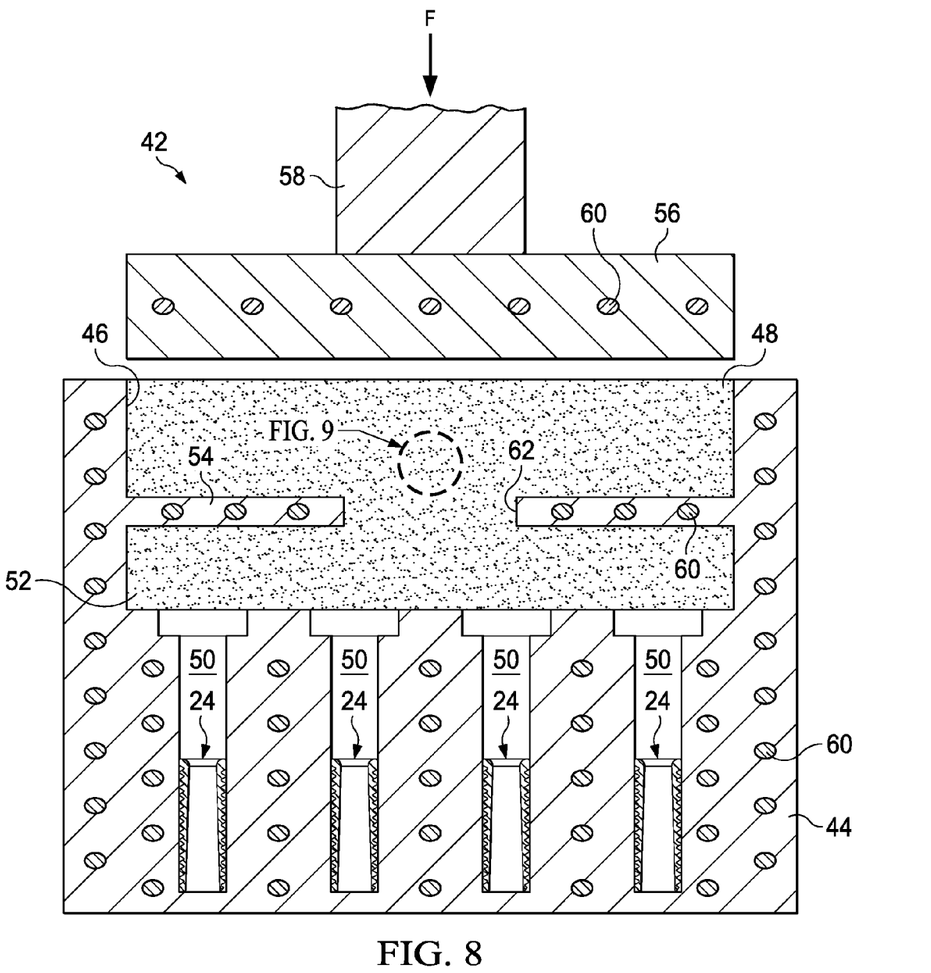
FIG. 8 is an illustration of a cross-sectional view of a compression molding machine filled with a charge of thermoplastic fiber flakes, metal sleeves having been inserted in mold cavities.
Figure 9:
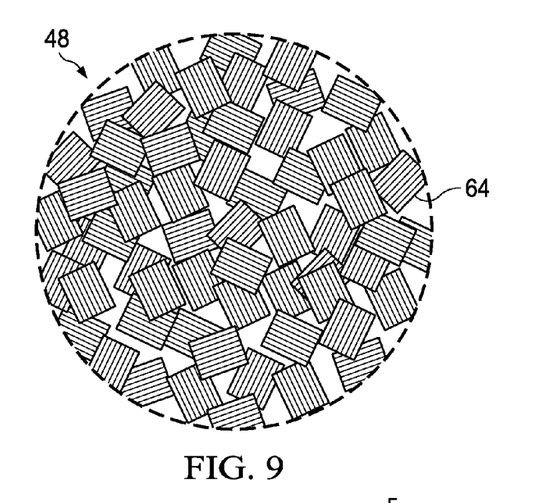
FIG. 9 is an illustration of the area shown as "FIG. 9" in FIG. 8.
Figure 10:
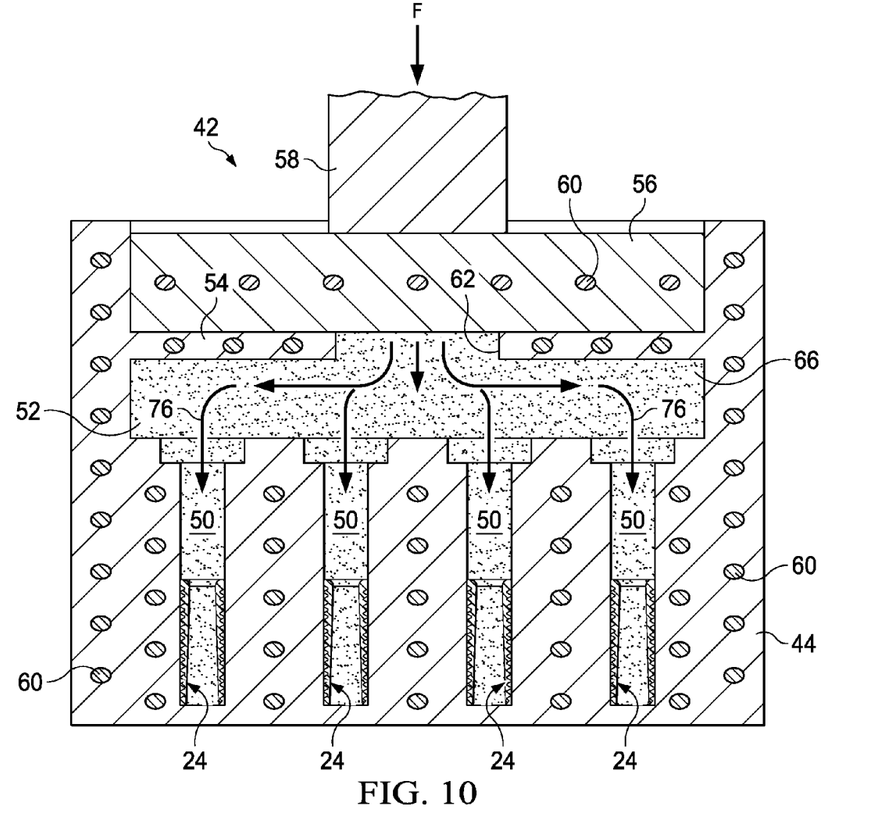
FIG. 10 is an illustration similar to FIG. 8, but showing the charge having been melted, flowed and compressed into the mold cavities.

Attention is now directed to FIGS. 8, 9 and 10 which illustrate one method of fabricating the hybrid fastener 20 described above, using compression molding. A compression molding machine 42 includes a mold 44 having one or more cavities 50 therein which respectively correspond to the size and geometry of the hybrid fastener 20. The mold 44 may include an integrated upper reservoir 46 into which a charge 48 of resin fiber flakes 64 may be placed in preparation for a molding operation. The reservoir 46 is separated from a flow area 52 above the mold cavities 50 by a partition wall 54 having a central flow-through opening 62 therein. A male die 56 powered by a ram 58 is adapted to be driven into the area of the mold 16 defining the reservoir 46. The male die 56 and the mold 44, including the area surrounding the reservoir 46, are heated by integrated heating elements 60, or other heating devices.

Referring to FIG. 9, the charge 48 may comprise individual resin fiber flakes 64 formed, for example and without limitation, by chopping or cutting pre-preg tape or sheets into individual flakes of a desired shape. The pre-preg may comprise unidirectional or bidirectional fibers pre-impregnated with a suitable thermoplastic resin of the type previously discussed. The fiber flakes 64 have relatively short fibers and substantially random fiber orientations within the charge 48.

Referring particularly to FIG. 8, in preparation for a molding operation, metal sleeves 24 are placed in the mold cavities 50, following which the reservoir 46 is filled with a charge 48 of the resin fiber flakes 64. The charge 48 is heated until the resin in the fiber flakes 64 melts, creating a mixture of melted resin and randomly oriented fiber flakes 64. Referring to FIG. 10, the ram 58 drives the male die 56 downwardly into the reservoir 46 using a force F, compressing the melted charge 48 and forcing a mixture 66 of the melted resin and the fiber flakes 64 to flow through the central opening 62 into the flow area 52. The flow area 52 assists in distributing the flowable mixture of resin and fiber flakes 64, and the compression force provided by the male die 56 forces the flowable mixture 66 into each of the die cavities 50. The random fiber orientations of the fiber flakes 64 is maintained after the mixture 66 is flowed and compressed into the mold cavities 50. Upon completion of the mold cycle, the mold 44 is cooled and parted to allow removal of the finished hybrid fasteners 20.

Figure 11:
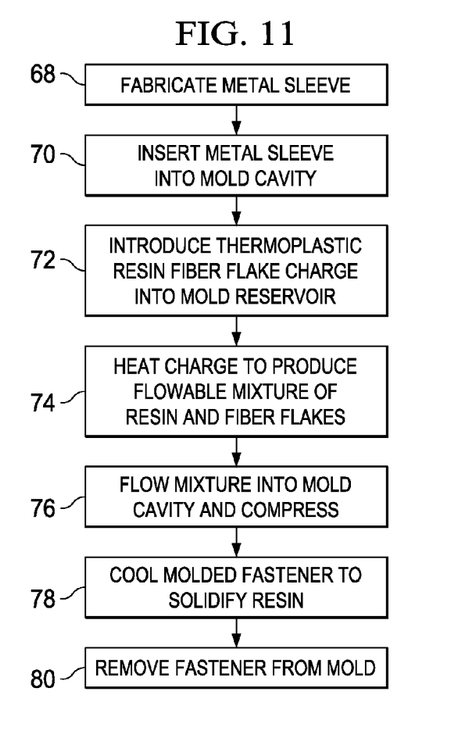
FIG. 11 is an illustration of a flow diagram of a method of fabricating the hybrid fastener.

Attention is now directed to FIG. 11 which broadly illustrates the overall steps of a method of fabricating hybrid fasteners 20 of the type previously described. Beginning at 68, a metal sleeve 24 is fabricated using any of various known fabrication techniques. At 70, the metal sleeve 24 is inserted into a mold cavity 50. At step 72, a charge 48 of thermoplastic fiber flakes 64 is introduced into a mold reservoir 46. At step 74, the charge is heated until the thermoplastic resin melts, producing a flowable mixture 66 of thermoplastic resin and fiber flakes 64. At 76, the mixture 66 of the melted resin and fiber flakes 64 is flowed into the mold cavity 50, and the mixture 66 is compressed using, for example, compression molding equipment. At step 78, the molded hybrid fastener 20 is allowed to cool and solidify, following which at step 80, the fastener 20 is removed from the mold.

Figure 12:
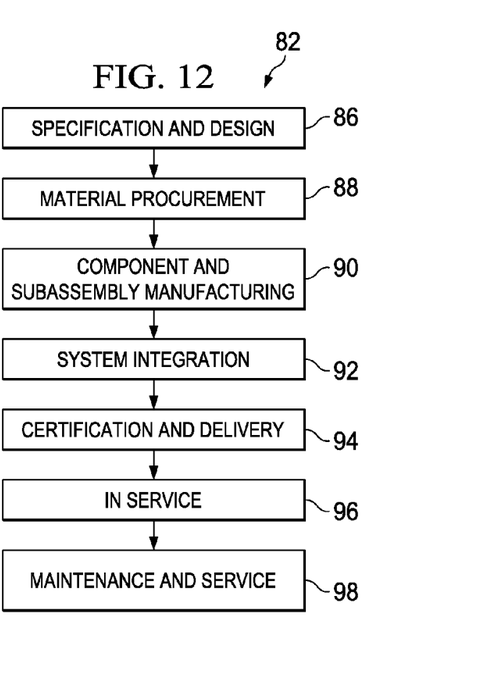
FIG. 12 is an illustration of a flow diagram of aircraft production and service methodology.
Figure 13:
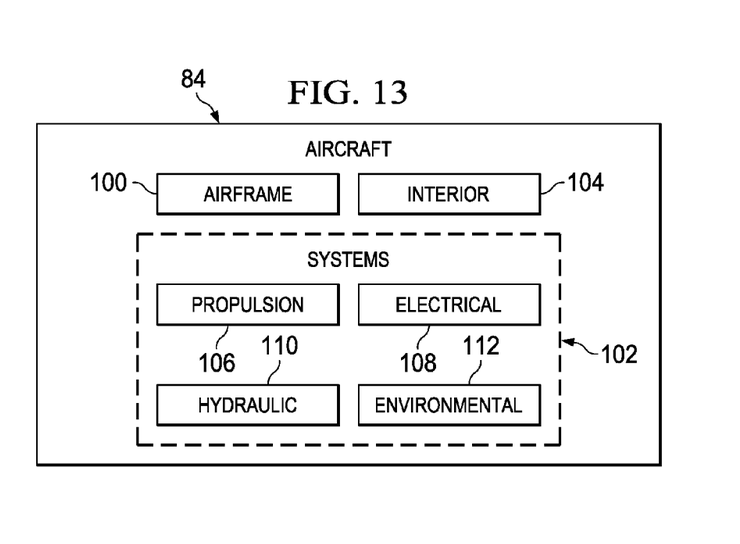
FIG. 13 is illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 12 and 13, embodiments of the disclosure may be used in the context of an aircraft manufacturing and service method 82 as shown in FIG. 12 and an aircraft 84 as shown in FIG. 13. Aircraft applications of the disclosed embodiments may include, for example, without limitation, fasteners used in the airframe 100 for the interior 104 of the aircraft 84, to name only a few. During pre-production, exemplary method may include specification and design 86 of the aircraft 84 and material procurement 88. During production, component and subassembly manufacturing 90 and system integration into of the aircraft 84 takes place. Thereafter, the aircraft 84 may go through certification and delivery 94 in order to be placed in service 96. While in service by a customer, the aircraft 84 is scheduled for routine maintenance and service 98, which may also include modification, reconfiguration, refurbishment, and so on.

Each of the processes of method 82 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 84 produced by exemplary method 82 may include an airframe 100 with a plurality of systems 102 and an interior 104. Examples of high-level systems 102 include one or more of a propulsion system 106, an electrical system 108, a hydraulic system 110, and an environmental system 112. Any number of other systems may be included. Although an aerospace example is shown, the principles of the disclosure may be applied to other industries, such as the marine and automotive industries.

Systems and methods embodied herein may be employed during any one or more of the stages of the production and service method 82. For example, components or subassemblies corresponding to production process 90 may be fabricated or manufactured in a manner similar to components or subassemblies produced while the aircraft 242 is in service. Also, one or more apparatus embodiments, method embodiments, or a combination thereof may be utilized during the production stages 90 and 92, for example, by substantially expediting assembly of or reducing the cost of an aircraft 84. Similarly, one or more of apparatus embodiments, method embodiments, or a combination thereof may be utilized while the aircraft 84 is in service, for example and without limitation, to maintenance and service 90.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A hybrid fastener, comprising:
   a composite body that comprises a shank, a shoulder, and a tip; and
   a metal sleeve configured as a singular piece connected to the composite body via die mold formation, such that the metal sleeve covers an outer surface of the tip, one end of the metal sleeve aligns flush with an end of the tip, and another end of the metal sleeve engages the shoulder, such that a width of the tip varies along a length of the tip such that the width tapers from a second end of the composite body to the shoulder of the composite body.

2. The hybrid fastener of claim 1, wherein the outer surface of the tip comprises a rough surface texture, and the tip and the metal sleeve each comprise complementary tapered surfaces configured to lock the metal sleeve to the tip.

3. The hybrid fastener of claim 1, wherein the metal sleeve includes outer threads, and the composite body comprises at least 60% by volume of reinforcing fibers.

4. The hybrid fastener of claim 1, wherein:
the another end of the metal sleeve engages the shoulder of the composite body such that a compressive load on the metal sleeve transfers to the shank.

5. The hybrid fastener of claim 1, wherein the composite body comprises a thermoplastic resin and randomly oriented, short reinforcing fibers distributed throughout the thermoplastic resin.

6. The hybrid fastener of claim 1, wherein:
the metal sleeve includes an inner surface engaging the outer surface of the tip substantially along an entirety of the length of the tip.

7. The hybrid fastener of claim 1, wherein the composite body comprises a thermoplastic resin reinforced with fiber flakes that comprise a substantially random fiber orientation.

8. The hybrid fastener of claim 1, wherein each of the tip and the metal sleeve comprise non-circular cross-sectional shapes.

9. The hybrid fastener of claim 1, a cross-sectional shape of each of the outer surface of the tip and an inner surface of the metal sleeve are substantially circular.

10. The hybrid fastener of claim 1, wherein the tip and the metal sleeve each comprise complementary tapered surfaces configured to lock the metal sleeve to the tip.

11. A hybrid male fastener, comprising:
a composite body that comprises a shank and a tip on the shank, such that the tip comprises an outer surface that comprises a taper; and,
a metal sleeve on the tip, such that the metal sleeve comprises a singular piece that comprises an inner surface that comprises a taper that substantially matches the taper of the tip such that the inner surface engages the outer surface of the tip along an entirety of a length of the tip, one end of the metal sleeve aligns flush with an end of the tip, and such that a width of the tip varies along the length of the tip such that the width tapers from a second end of the composite body to a shoulder of the composite body.

12. The hybrid male fastener of claim 11, wherein the metal sleeve includes a threaded outer surface.

13. The hybrid male fastener of claim 11, wherein:
a cross-sectional shape of each of the outer surface of the tip and the inner surface of the metal sleeve are substantially circular.

14. The hybrid male fastener of claim 11, wherein:
a cross-sectional shape of each of the outer surface of the tip and the inner surface of the metal sleeve comprises an order of asymmetry about a longitudinal axis of the composite body.

15. The hybrid male fastener of claim 11, wherein the composite body includes a thermoplastic resin reinforced with fiber flakes having a substantially random fiber orientation.

16. A fastener, that comprises:
a resin body that comprises an elongate shaft that comprises:
a first that comprises a head;
a second end;
a shoulder;
a tip, such that the second end of the shaft comprises the tip and the tip comprises: a length, and an outer surface that tapers radially along the length of the tip; and
a metal sleeve configured as a singular piece connected to the outer surface of the tip via die mold formation, such that the metal sleeve covers the outer surface of the tip, one end of the metal sleeve aligns flush with an end of the tip, another end of the metal sleeve engages the shoulder, such that the tip and the metal sleeve each comprise a taper radially outward in a direction away from the head, and the metal sleeve comprises:
an outer surface of the metal sleeve that comprises male threads; and
an inner surface that engages and tapers to substantially match the taper of the outer surface of the tip, the outer surface of the tip and the inner surface of the metal sleeve being configured to interlock and hold the metal sleeve on the shaft.

17. The fastener of claim 16, wherein the resin body includes a thermoplastic resin reinforced with fiber flakes having substantially random fiber orientations.

18. The fastener of claim 16, wherein the tip comprises a cross-sectional shape that varies along the length of the tip, and outer surface of the tip comprises a rough surface texture.

19. The fastener of claim 16, wherein the metal sleeve and the tip are substantially coaxial.

20. The fastener of claim 16, wherein each of the tip and the metal sleeve comprise non-circular cross-sectional shapes.

\* \* \* \* \*